US011516896B2

(12) United States Patent
Liu et al.

(10) Patent No.: US 11,516,896 B2
(45) Date of Patent: Nov. 29, 2022

(54) LUMINESCENT MICROSPHERES AND PREPARATION METHOD THEREOF

(71) Applicant: Tianjin Namei Nami Technology Co., Ltd., Tianjin (CN)

(72) Inventors: Guang Liu, Tianjin (CN); Baojie Zhao, Tianjin (CN); Haipeng Liu, Tianjin (CN); Yi Wang, Tianjin (CN)

(73) Assignee: TIANJIN NAMEI NAMI TECHNOLOGY CO., LTD., Tianjin (CN)

(*) Notice: Subject to any disclaimer, the term of this patent is extended or adjusted under 35 U.S.C. 154(b) by 49 days.

(21) Appl. No.: 17/185,989

(22) Filed: Feb. 26, 2021

(65) Prior Publication Data

US 2022/0095424 A1    Mar. 24, 2022

(30) Foreign Application Priority Data

Sep. 21, 2020 (CN) .......................... 202010991623.5

(51) Int. Cl.
| | | |
|---|---|---|
| *H05B 33/10* | (2006.01) | |
| *C09K 11/02* | (2006.01) | |
| *C09K 11/88* | (2006.01) | |
| *H05B 33/02* | (2006.01) | |
| *H05B 33/14* | (2006.01) | |
| *H05B 33/22* | (2006.01) | |
| *B01J 13/02* | (2006.01) | |

(52) U.S. Cl.
CPC .............. *H05B 33/10* (2013.01); *B01J 13/02* (2013.01); *C09K 11/025* (2013.01); *C09K 11/883* (2013.01); *H05B 33/02* (2013.01); *H05B 33/145* (2013.01); *H05B 33/22* (2013.01)

(58) Field of Classification Search
CPC ....... C09K 11/883; C09K 11/025; B01J 13/02
See application file for complete search history.

(56) References Cited

U.S. PATENT DOCUMENTS 8,847,197 B2 * 9/2014 Pickett .................. H01L 33/005
257/13
8,921,827 B2 * 12/2014 Pickett ................ C09K 11/883
257/789

FOREIGN PATENT DOCUMENTS

| CN | 1995276 A | 7/2007 |
| CN | 101595201 A | 12/2009 |

* cited by examiner

*Primary Examiner* — C Melissa Koslow
(74) *Attorney, Agent, or Firm* — Bayramoglu Law Offices LLC

(57) ABSTRACT

Luminescent microspheres and a preparation method thereof are disclosed. The preparation method includes: 1) preparing cadmium oxide-doped silica microspheres; 2) adding the silica microspheres to a mixed solution of octadecene/oleic acid or trioctylamine (TOA)/oleic acid, and heating a resulting mixture to a boiling point so that the microspheres swell at high temperature and the oleic acid penetrates into the microspheres to react with CdO to obtain an organic cadmium-adsorbed silica suspension; and 3) adding a selenium precursor to the obtained organic cadmium-adsorbed silica suspension to obtain the luminescent microspheres, where, the selenium precursor reacts with the adsorbed organic cadmium to form CdSe. The luminescent microspheres provided in the present disclosure have high fluorescence efficiency and prominent stability, require no barrier materials such as barrier films for protection, and can be directly used for light conversion materials with high color gamut such as luminescent films, luminescent plates, Mini-LEDs, and Micro-LEDs.

20 Claims, 2 Drawing Sheets

LUMINESCENT MICROSPHERES AND PREPARATION METHOD THEREOF

CROSS REFERENCE TO THE RELATED APPLICATIONS

This application is based upon and claims priority to Chinese Patent Application No. 202010991623.5, filed on Sep. 21, 2020, the entire contents of which are incorporated herein by reference.

TECHNICAL FIELD

The present disclosure belongs to the technical field of luminescent materials, and specifically relates to luminescent microspheres and a preparation method thereof.

BACKGROUND

At present, a white light-emitting diode (LED) involves a GaInN blue LED and a YAG ($Y_3Al_5O_{12}:Ce^{3+}$) phosphor. The GaInN blue LED excites the YAG phosphor to produce yellow light and the yellow light is then mixed with blue light of the blue LED to form white light. Due to the lack of red light in an emission spectrum of the YAG phosphor, there are defects such as low color rendering index (CRI) and high color temperature. Therefore, the mode of exciting a phosphor with a near ultraviolet (NUV) LED to realize a white LED has attracted much attention. In this mode, a phosphor with a more comprehensive emission spectrum can be selected to achieve a white LED, so that an obtained white LED has significantly-improved CRI and color temperature. There are many types of NUV-excited phosphors. Aluminate and silicate phosphors are very common, especially alkaline earth metal aluminates and silicates that are excited by rare earth ions. Alkaline earth metal aluminates and silicates exhibit excellent thermal and chemical stabilities, which have a wide excitation spectrum and can be excited by ultraviolet (UV), NUV, and blue light, with high luminescence efficiency and large emission wavelength coverage. Aluminosilicate phosphors also have the characteristics of the above-mentioned aluminate and silicate matrices, as described in CN1995276A and CN101595201A. However, there are still few aluminosilicate-based phosphors.

In addition, other phosphors have a large full width at half maxima (FWHM) and low display color gamut resulting in the poor stability of organic fluorescent substances. Additionally, inorganic quantum dots also need the protection of water and oxygen, thus causing many limitations. In view of this, the present invention is proposed.

SUMMARY

The present disclosure is intended to provide luminescent microspheres and a preparation method thereof. The luminescent microspheres of the present disclosure have high fluorescence efficiency (reaching 95% or higher) and prominent stability, require no barrier materials such as barrier films for protection during use, and can be directly used for light conversion materials with high color gamut such as luminescent films, luminescent plates, Mini-LEDs, and Micro-LEDs.

To achieve the above objective, the present disclosure adopts the following technical solutions.

The present disclosure provides a preparation method of luminescent microspheres, including the following steps:

1) preparing cadmium oxide-doped silica microspheres from tetraethyl orthosilicate (TEOS);

2) adding the cadmium oxide-doped silica microspheres to a solution of octadecene/oleic acid or trioctylamine (TOA)/oleic acid, and heating a resulting mixture to boiling and keeping a boiling state for 1 min to 30 min so that the microspheres swell at high temperature and the oleic acid penetrates the microspheres to react with CdO to obtain an organic cadmium-adsorbed silica suspension; and 3) adding a selenium precursor to the obtained organic cadmium-adsorbed silica suspension to obtain the luminescent microspheres, where the selenium precursor reacts with the adsorbed organic cadmium to form CdSe.

The luminescent microspheres obtained by the method of the present disclosure have high fluorescence efficiency (reaching 95% or higher), require no barrier materials such as barrier films for protection during use, and can be directly used for light conversion materials with high color gamut such as luminescent films, luminescent plates, Mini-LEDs, and Micro-LEDs.

Further, in step 2), the cadmium oxide-doped silica microspheres may be added at an amount 1% to 10% (w/v) of the oleic acid solution.

Further, in the oleic acid solution, the octadecene or TOA may have a volume ratio of 1:1 to 9:1 with the oleic acid.

Further, in step 3), the selenium precursor may have a molar ratio of 1:1 to 3:1 with the organic cadmium in the organic cadmium-adsorbed silica suspension.

Further, the selenium precursor may be one or two of tributylphosphine selenide (TBPSe) and trioctylphosphine selenide (TOPSe).

Further, step 1 may specifically include:

a) dissolving cadmium nitrate in an ethanol aqueous solution to obtain a cadmium nitrate solution;

b) immersing a three-dimensional (3D) macroporous carbon template in the cadmium nitrate solution obtained in step a) and drying the template to obtain a cadmium nitrate-deposited template; conducting this step repeatedly until cadmium nitrate deposited in the template has a mass ratio of 8% to 12%; and isolating the template from air and heating the template to obtain a cadmium oxide-deposited template;

c) dissolving tetraethyl orthosilicate (TEOS) in a mixed solution of ethanol, water and acid to obtain a TEOS sol; and d) immersing the cadmium oxide-deposited template in step b) in the TEOS sol prepared in step c), burning the template in air after solvents are volatilized, and grinding a product to obtain the cadmium oxide-doped silica microspheres.

Further, in step b), the template may be heated to 420° C. to 480° C.

Further, in step d), the burning in air may refer to burning in air at 580° C. to 620° C.

The present disclosure also provides luminescent microspheres prepared by the preparation method of the present disclosure.

The luminescent microspheres of the present disclosure may have fluorescence efficiency not less than 95%.

Compared with the prior art, the present disclosure has the following advantages:

The luminescent microspheres provided in the present disclosure have high fluorescence efficiency and prominent stability, require no barrier materials such as barrier films for protection, and can be directly used for light conversion materials with high color gamut such as luminescent films, luminescent diffuser plates, Mini-LEDs, and Micro-LEDs.

DETAILED DESCRIPTION OF THE EMBODIMENTS

The technical solutions in the examples of the present disclosure are clearly and completely described below with reference to the examples of the present disclosure. Apparently, the described examples are merely a part rather than all of the examples of the present disclosure. All other examples obtained by a person of ordinary skill in the art based on the examples of the present disclosure without creative efforts shall fall within the protection scope of the present disclosure.

Example 1

I. Preparation of Cadmium Oxide-Doped Silica Microspheres

1) Cadmium nitrate was dissolved in an ethanol aqueous solution to obtain a cadmium nitrate solution. The ethanol had a mass concentration of 50% and the cadmium nitrate had a mass concentration of 10%.

2) A 3D macroporous carbon template was immersed in the cadmium nitrate solution obtained in step 1) and then dried to obtain a cadmium nitrate-deposited template. The step was conducted repeatedly until cadmium nitrate deposited in the template had a mass ratio of 10%. Then the template was isolated from air and heated to 450° C. so that cadmium nitrate was decomposed into cadmium oxide and nitrogen dioxide and cadmium oxide was deposited in the template.

3) TEOS was dissolved in a mixed solution of ethanol, water, and hydrochloric acid, and a resulting mixture was thoroughly stirred to obtain a TEOS sol. The TEOS had a mass concentration of 40%, the ethanol had a mass concentration of 58%, the water had a mass concentration of 1%, and the 2 M hydrochloric acid had a mass concentration of 1%.

4) The cadmium oxide-deposited template in step 2) was immersed in the TEOS sol prepared in step 3), and the solvents were allowed to slowly volatilize so that the TEOS sol on the template underwent gelation; and then a product was burnt in air at 600° C. to remove the template and then ground to obtain cadmium oxide-doped silica microspheres.

II. Preparation of Luminescent Microspheres

1) The cadmium oxide-doped silica microspheres were added to a mixed solution of TOA/oleic acid, and a resulting mixture was heated to boiling and kept at a boiling state for 15 min so that the microspheres swelled at high temperature and the oleic acid penetrated into the microspheres to react with CdO to obtain an organic cadmium-adsorbed silica suspension. The cadmium oxide-doped silica microspheres were added at an amount 8% (w/v) of the mixed solution, and the TOA and oleic acid had a volume ratio of 5:1 in the mixed solution.

2) A selenium precursor TBPSe was added to the obtained organic cadmium-adsorbed silica suspension to obtain luminescent microspheres, where, the selenium precursor reacted with the adsorbed organic cadmium to form CdSe. The selenium precursor TBPSe had a molar ratio of 2:1 with the organic cadmium in the organic cadmium-adsorbed silica suspension.

Figure 1:
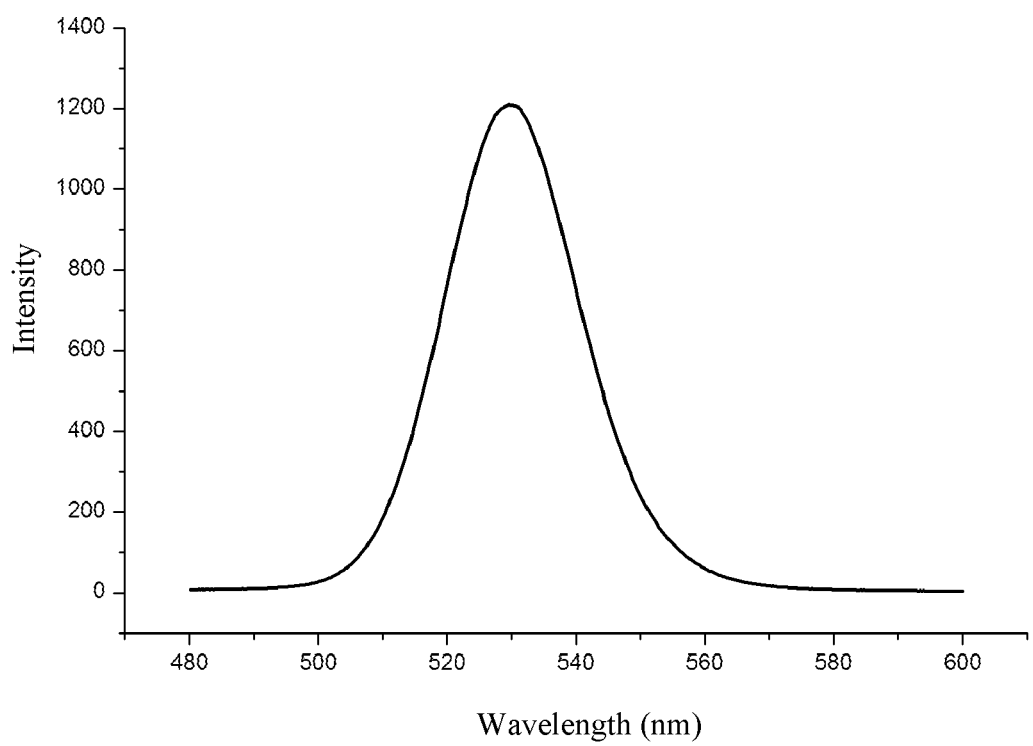
FIG. 1 is a luminescence spectrum of the luminescent microspheres prepared in the present disclosure.

As determined, the luminescent microspheres prepared in this example had fluorescence efficiency of 95%, and a luminescence spectrum of the luminescent microspheres was shown in FIG. 1. It can be seen from the figure that there is an emission wavelength at 530 nm and an FWHM of 22 nm, indicating a pure color. The emission wavelength can be adjusted by changing a proportion of the added precursor Se, which covers the entire visible light region.

Figure 2:
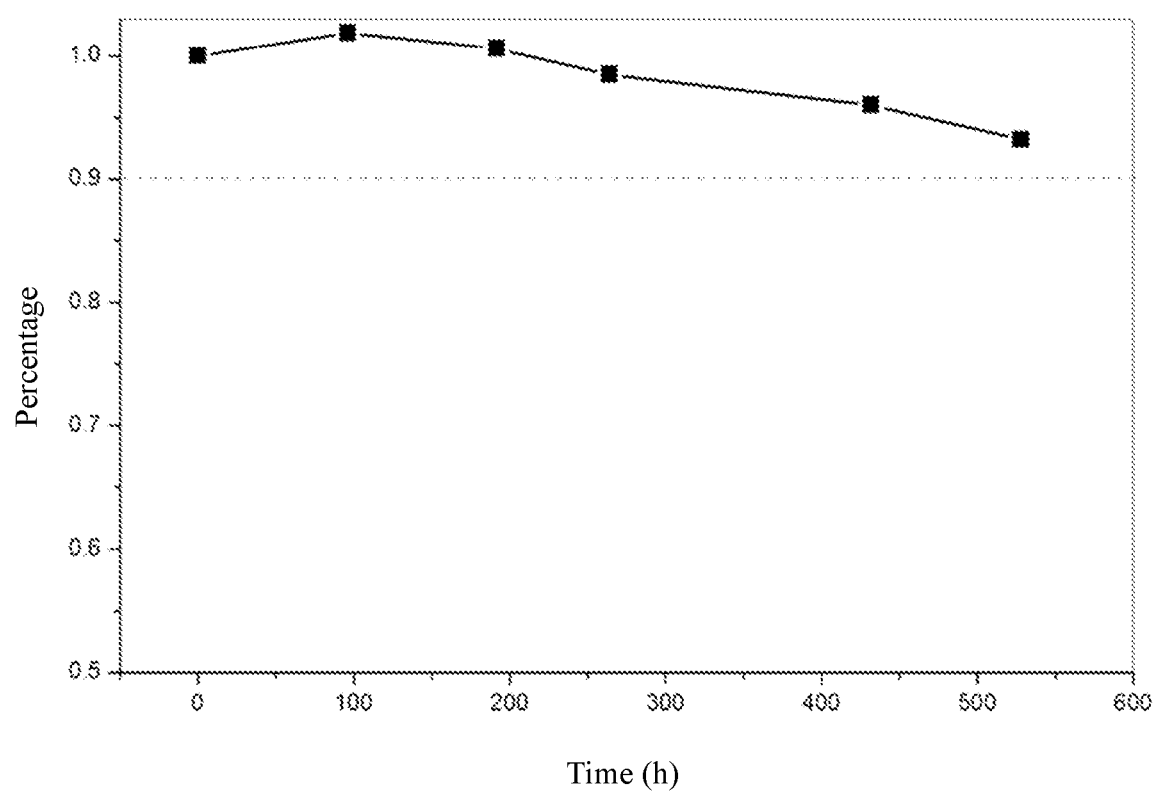
FIG. 2 shows the attenuation of fluorescence efficiency of the luminescent microspheres prepared in the present disclosure under high-intensity blue light irradiation (380 W/m$^2$)
Figure 3:
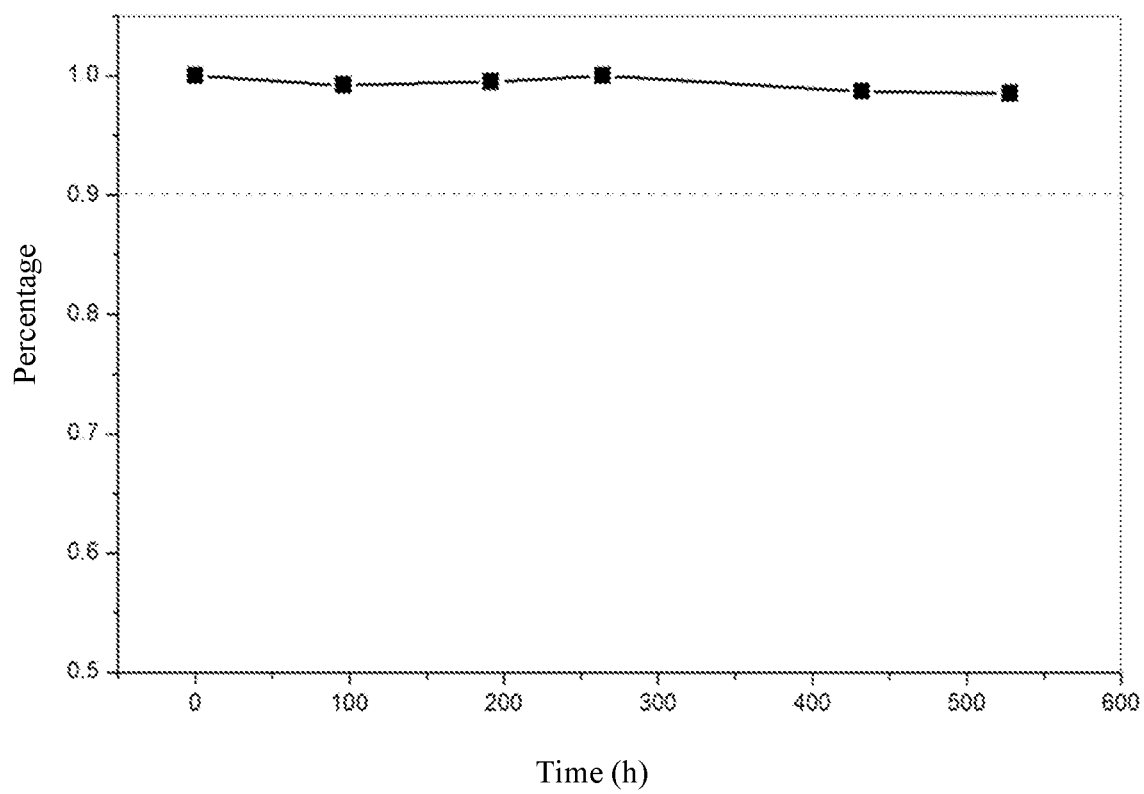
FIG. 3 shows the attenuation of fluorescence efficiency of the luminescent microspheres prepared in the present disclosure at 85° C.
Figure 4:
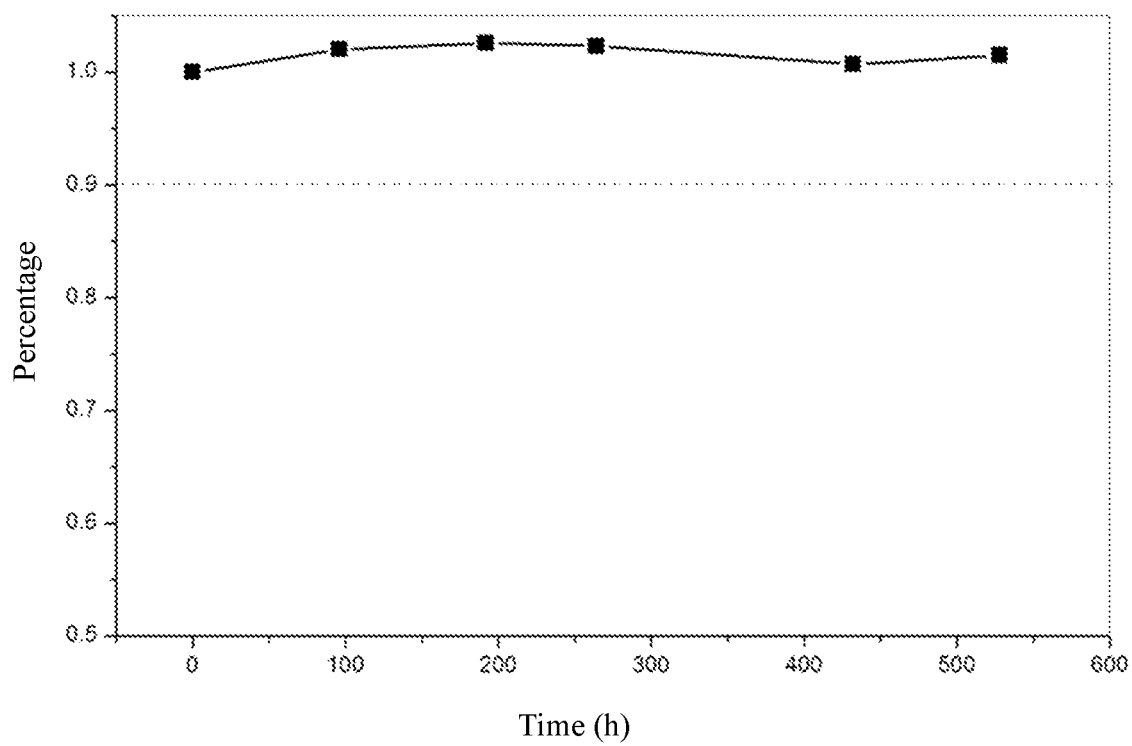
FIG. 4 shows the attenuation of fluorescence efficiency of the luminescent microspheres prepared in the present disclosure at a temperature of 65° C. and a humidity of 95%.

The luminescent microspheres were subjected to each of a high-intensity blue light irradiation (380 W/m$^2$) test, a high temperature test (85° C.), and a high temperature and high humidity test (65° C. and 95%) for 500 h, and the attenuation of fluorescence efficiency was within 10% (as shown in FIG. 2, FIG. 3, and FIG. 4). In the high temperature test and the high temperature and high humidity test, basically, the fluorescence efficiency did not change. It indicates that the luminescent microspheres have high stability.

Example 2

I. Preparation of Cadmium Oxide-Doped Silica Microspheres

1) Cadmium nitrate was dissolved in an ethanol aqueous solution to obtain a cadmium nitrate solution. The ethanol had a mass concentration of 50% and the cadmium nitrate had a mass concentration of 10%.

2) A 3D macroporous carbon template was immersed in the cadmium nitrate solution obtained in step 1) and then dried to obtain a cadmium nitrate-deposited template. The step was conducted repeatedly until cadmium nitrate deposited in the template had a mass ratio of 8%. Then the template was isolated from air and heated to 420° C. so that cadmium nitrate was decomposed into cadmium oxide and nitrogen dioxide and cadmium oxide was deposited in the template.

3) TEOS was dissolved in a mixed solution of ethanol, water, and hydrochloric acid, and a resulting mixture was thoroughly stirred to obtain a TEOS sol. The TEOS had a mass concentration of 40%, the ethanol had a mass concentration of 58%, the water had a mass concentration of 1%, and the 2 M hydrochloric acid had a mass concentration of 1%.

4) The cadmium oxide-deposited template in step 2) was immersed in the TEOS sol prepared in step 3), and the solvents were allowed to slowly volatilize so that the TEOS sol on the template underwent gelation; and then a product was burnt in air at 580° C. to remove the template and then ground to obtain cadmium oxide-doped silica microspheres.

II. Preparation of Luminescent Microspheres

1) The cadmium oxide-doped silica microspheres were added to a mixed solution of TOA/oleic acid, and a resulting mixture was heated to boiling and kept at a boiling state for 10 min so that the microspheres swelled at high temperature and the oleic acid penetrated into the microspheres to react with CdO to obtain an organic cadmium-adsorbed silica suspension. The cadmium oxide-doped silica microspheres were added at an amount 1% (w/v) of the mixed solution, and the TOA and oleic acid had a volume ratio of 5:5 in the mixed solution.

2) A selenium precursor TBPSe was added to the obtained organic cadmium-adsorbed silica suspension to obtain luminescent microspheres, where, the selenium precursor reacted with the adsorbed organic cadmium to form CdSe. The selenium precursor TBPSe had a molar ratio of 1:1 with the organic cadmium in the organic cadmium-adsorbed silica suspension.

As determined, the luminescent microspheres prepared in this example had fluorescence efficiency of 95.6%, and a luminescence spectrum of the luminescent microspheres was similar to that of Example 1. The luminescent microspheres were subjected to each of a high-intensity blue light irradiation (380 W/m$^2$) test, a high temperature test (85° C.), and a high temperature and high humidity test (65° C. and 95%) for 500 h, and the attenuation of fluorescence efficiency was within 10%, which was similar to Example 1.

Example 3

I. Preparation of Cadmium Oxide-Doped Silica Microspheres

1) Cadmium nitrate was dissolved in an ethanol aqueous solution to obtain a cadmium nitrate solution. The ethanol had a mass concentration of 50% and the cadmium nitrate had a mass concentration of 10%.

2) A 3D macroporous carbon template was immersed in the cadmium nitrate solution obtained in step 1) and then dried to obtain a cadmium nitrate-deposited template. The step was conducted repeatedly until cadmium nitrate deposited in the template had a mass ratio of 12%. Then the template was isolated from air and heated to 480° C. so that cadmium nitrate was decomposed into cadmium oxide and nitrogen dioxide and cadmium oxide was deposited in the template.

3) TEOS was dissolved in a mixed solution of ethanol, water, and hydrochloric acid, and a resulting mixture was thoroughly stirred to obtain a TEOS sol. The TEOS had a mass concentration of 40%, the ethanol had a mass concentration of 58%, the water had a mass concentration of 1%, and the 2 M hydrochloric acid had a mass concentration of 1%.

4) The cadmium oxide-deposited template in step 2) was immersed in the TEOS sol prepared in step 3), and the solvents were allowed to slowly volatilize so that the TEOS sol on the template underwent gelation; and then a product was burnt in air at 620° C. to remove the template and then ground to obtain cadmium oxide-doped silica microspheres.

II. Preparation of Luminescent Microspheres

1) The cadmium oxide-doped silica microspheres were added to a mixed solution of TOA/oleic acid, and a resulting mixture was heated to boiling and kept at a boiling state for 1 min so that the microspheres swelled at high temperature and the oleic acid penetrated into the microspheres to react with CdO to obtain an organic cadmium-adsorbed silica suspension. The cadmium oxide-doped silica microspheres were added at an amount 10% (w/v) of the mixed solution, and the TOA and oleic acid had a volume ratio of 9:1 in the mixed solution.

2) A selenium precursor TOPSe was added to the obtained organic cadmium-adsorbed silica suspension to obtain luminescent microspheres, where, the selenium precursor reacted with the adsorbed organic cadmium to form CdSe. The selenium precursor TOPSe had a molar ratio of 3:1 with the organic cadmium in the organic cadmium-adsorbed silica suspension.

As determined, the luminescent microspheres prepared in this example had fluorescence efficiency of 95.2%, and a luminescence spectrum of the luminescent microspheres was similar to that of Example 1. The luminescent microspheres were subjected to each of a high-intensity blue light irradiation (380 W/m$^2$) test, a high temperature test (85° C.), and a high temperature and high humidity test (65° C. and 95%) for 500 h, and the attenuation of fluorescence efficiency was within 10%, which was similar to Example 1.

Example 4

I. Preparation of Cadmium Oxide-Doped Silica Microspheres

1) Cadmium nitrate was dissolved in an ethanol aqueous solution to obtain a cadmium nitrate solution. The ethanol had a mass concentration of 50% and the cadmium nitrate had a mass concentration of 10%.

2) A 3D macroporous carbon template was immersed in the cadmium nitrate solution obtained in step 1) and then dried to obtain a cadmium nitrate-deposited template. The step was conducted repeatedly until cadmium nitrate deposited in the template had a mass ratio of 9%. Then the template was isolated from air and heated to 430° C. so that cadmium nitrate was decomposed into cadmium oxide and nitrogen dioxide and cadmium oxide was deposited in the template.

3) TEOS was dissolved in a mixed solution of ethanol, water, and hydrochloric acid, and a resulting mixture was thoroughly stirred to obtain a TEOS sol. The TEOS had a mass concentration of 40%, the ethanol had a mass concentration of 58%, the water had a mass concentration of 1%, and the 2 M hydrochloric acid had a mass concentration of 1%.

4) The cadmium oxide-deposited template in step 2) was immersed in the TEOS sol prepared in step 3), and the solvents were allowed to slowly volatilize so that the TEOS sol on the template underwent gelation; and then a product was burnt in air at 610° C. to remove the template and then ground to obtain cadmium oxide-doped silica microspheres.

II. Preparation of Luminescent Microspheres

1) The cadmium oxide-doped silica microspheres were added to a mixed solution of octadecene/oleic acid, and a resulting mixture was heated to boiling and kept at a boiling state for 15 min so that the microspheres swelled at high temperature and the oleic acid penetrated into the microspheres to react with CdO to obtain an organic cadmium-adsorbed silica suspension. The cadmium oxide-doped silica microspheres were added at an amount 5% (w/v) of the mixed solution, and the octadecene and oleic acid had a volume ratio of 3:1 in the mixed solution.

2) A selenium precursor TOPSe was added to the obtained organic cadmium-adsorbed silica suspension to obtain luminescent microspheres, where, the selenium precursor reacted with the adsorbed organic cadmium to form CdSe. The selenium precursor TOPSe had a molar ratio of 1.5:1 with the organic cadmium in the organic cadmium-adsorbed silica suspension.

As determined, the luminescent microspheres prepared in this example had fluorescence efficiency of 95.1%, and a luminescence spectrum of the luminescent microspheres was similar to that of Example 1. The luminescent microspheres were subjected to each of a high-intensity blue light irradiation (380 W/m$^2$) test, a high temperature test (85° C.), and a high temperature and high humidity test (65° C. and 95%) for 500 h, and the attenuation of fluorescence efficiency was within 10%, which was similar to Example 1.

Example 5

I. Preparation of Cadmium Oxide-Doped Silica Microspheres

1) Cadmium nitrate was dissolved in an ethanol aqueous solution to obtain a cadmium nitrate solution. The ethanol had a mass concentration of 50% and the cadmium nitrate had a mass concentration of 10%.

2) A 3D macroporous carbon template was immersed in the cadmium nitrate solution obtained in step 1) and then dried to obtain a cadmium nitrate-deposited template. The step was conducted repeatedly until cadmium nitrate deposited in the template had a mass ratio of 10.5%. Then the template was isolated from air and heated to 465° C. so that cadmium nitrate was decomposed into cadmium oxide and nitrogen dioxide and cadmium oxide was deposited in the template.

3) TEOS was dissolved in a mixed solution of ethanol, water, and hydrochloric acid, and a resulting mixture was thoroughly stirred to obtain a TEOS sol. The TEOS had a mass concentration of 40%, the ethanol had a mass concentration of 58%, the water had a mass concentration of 1%, and the 2 M hydrochloric acid had a mass concentration of 1%.

4) The cadmium oxide-deposited template in step 2) was immersed in the TEOS sol prepared in step 3), and the solvents were allowed to slowly volatilize so that the TEOS sol on the template underwent gelation; and then a product was burnt in air at 595° C. to remove the template and then ground to obtain cadmium oxide-doped silica microspheres.

II. Preparation of Luminescent Microspheres

1) The cadmium oxide-doped silica microspheres were added to a mixed solution of octadecene/oleic acid, and a resulting mixture was heated to boiling and kept at a boiling state for 12 min so that the microspheres swelled at high temperature and the oleic acid penetrated into the microspheres to react with CdO to obtain an organic cadmium-adsorbed silica suspension. The cadmium oxide-doped silica microspheres were added at an amount 8.5% (w/v) of the mixed solution, and the octadecene and oleic acid had a volume ratio of 6.5:1 in the mixed solution.

2) A selenium precursor TBPSe was added to the obtained organic cadmium-adsorbed silica suspension to obtain luminescent microspheres, where, the selenium precursor reacted with the adsorbed organic cadmium to form CdSe. The selenium precursor TBPSe had a molar ratio of 2.5:1 with the organic cadmium in the organic cadmium-adsorbed silica suspension.

As determined, the luminescent microspheres prepared in this example had fluorescence efficiency of 95.4%, and a luminescence spectrum of the luminescent microspheres was similar to that of Example 1. The luminescent microspheres were subjected to each of a high-intensity blue light irradiation (380 W/m$^2$) test, a high temperature test (85° C.), and a high temperature and high humidity test (65° C. and 95%) for 500 h, and the attenuation of fluorescence efficiency was within 10%, which was similar to Example 1.

Finally, it should be noted that the above descriptions are only preferred examples of the present disclosure and are not intended to limit the present disclosure. Although the present disclosure is described in detail with reference to the foregoing examples, a person skilled in the art can still make modifications to the technical solutions described in the foregoing examples, or make equivalent replacement to some technical features. Any modifications, equivalent substitutions, improvements, and the like made within the spirit and principles of the present disclosure should be included in the protection scope of the present disclosure.

What is claimed is:

1. A preparation method of luminescent microspheres, comprising the following steps:
   1) Preparing cadmium oxide-doped silica microspheres;
   2) Adding the cadmium oxide-doped silica microspheres to a first mixed solution of octadecene/oleic acid or trioctylamine (TOA)/oleic acid to obtain a resulting mixture, and heating the resulting mixture to a boiling state and keeping the boiling state for 1 min to 30 min, wherein the cadmium oxide-doped silica microspheres produced from tetraethyl orthosilicate (TEOS) swell at a high temperature and the oleic acid penetrates into the microspheres to react with cadmium oxide (CdO) of the cadmium oxide-doped silica microspheres to obtain an organic cadmium-adsorbed silica suspension; and
   3) Adding a selenium precursor to the organic cadmium-adsorbed silica suspension to obtain the luminescent microspheres, wherein, the selenium precursor reacts with organic cadmium in the organic cadmium-adsorbed silica suspension to form cadmium selenide (CdSe).

2. The preparation method according to claim 1, wherein, in step 2), the cadmium oxide-doped silica microspheres are added at an amount 1% to 10% (w/v) of the first mixed solution.

3. The preparation method according to claim 2, wherein, step 1) comprises:
   a) dissolving cadmium nitrate in an ethanol aqueous solution to obtain a cadmium nitrate solution;
   b) immersing a three-dimensional (3D) macroporous carbon template in the cadmium nitrate solution obtained in step a) and drying the 3D macroporous carbon template to obtain a cadmium nitrate-deposited template; conducting the immersing and drying step repeatedly until the cadmium nitrate deposited in the cadmium nitrate-deposited template has a mass ratio of 8% to 12%; and isolating the cadmium nitrate-deposited template from air and heating the cadmium nitrate-deposited template to obtain a cadmium oxide-deposited template;
   c) dissolving tetraethyl orthosilicate (TEOS) in a second mixed solution of ethanol, water and acid to obtain a TEOS sol; and
   d) immersing the cadmium oxide-deposited template in step b) in the TEOS sol prepared in step c) to obtain a treated cadmium oxide-deposited template, burning the treated cadmium oxide-deposited template in air after the TEOS sol is volatilized to obtain a product, and grinding the product to obtain the cadmium oxide-doped silica microspheres.

4. The preparation method according to claim 2, wherein, in the first mixed solution, the octadecene or the TOA has a volume ratio of 1:1 to 9:1 with the oleic acid.

5. The preparation method according to claim 4, wherein, step 1) comprises:
   a) dissolving cadmium nitrate in an ethanol aqueous solution to obtain a cadmium nitrate solution;
   b) immersing a three-dimensional (3D) macroporous carbon template in the cadmium nitrate solution obtained in step a) and drying the 3D macroporous carbon template to obtain a cadmium nitrate-deposited template; conducting the immersing and drying step repeatedly until the cadmium nitrate deposited in the cadmium nitrate-deposited template has a mass ratio of 8% to 12%; and isolating the cadmium nitrate-deposited template from air and heating the cadmium nitrate-deposited template to obtain a cadmium oxide-deposited template;

c) dissolving tetraethyl orthosilicate (TEOS) in a second mixed solution of ethanol, water and acid to obtain a TEOS sol; and d) immersing the cadmium oxide-deposited template in step b) in the TEOS sol prepared in step c) to obtain a treated cadmium oxide-deposited template, burning the treated cadmium oxide-deposited template in air after the TEOS sol is volatilized to obtain a product, and grinding the product to obtain the cadmium oxide-doped silica microspheres.

6. The preparation method according to claim 1, wherein, in step 3), the selenium precursor has a molar ratio of 1:1 to 3:1 with the organic cadmium in the organic cadmium-adsorbed silica suspension.

7. The preparation method according to claim 6, wherein, step 1) comprises:
a) dissolving cadmium nitrate in an ethanol aqueous solution to obtain a cadmium nitrate solution;
b) immersing a three-dimensional (3D) macroporous carbon template in the cadmium nitrate solution obtained in step a) and drying the 3D macroporous carbon template to obtain a cadmium nitrate-deposited template; conducting the immersing and drying step repeatedly until the cadmium nitrate deposited in the cadmium nitrate-deposited template has a mass ratio of 8% to 12%; and isolating the cadmium nitrate-deposited template from air and heating the cadmium nitrate-deposited template to obtain a cadmium oxide-deposited template;
c) dissolving tetraethyl orthosilicate (TEOS) in a second mixed solution of ethanol, water and acid to obtain a TEOS sol; and
d) immersing the cadmium oxide-deposited template in step b) in the TEOS sol prepared in step c) to obtain a treated cadmium oxide-deposited template, burning the treated cadmium oxide-deposited template in air after the TEOS sol is volatilized to obtain a product, and grinding the product to obtain the cadmium oxide-doped silica microspheres.

8. The preparation method according to claim 6, wherein, the selenium precursor is at least one selected from the group consisting of tributylphosphine selenide (TBPSe) and trioctylphosphine selenide (TOPSe).

9. The preparation method according to claim 8, wherein, step 1) comprises:
a) dissolving cadmium nitrate in an ethanol aqueous solution to obtain a cadmium nitrate solution;
b) immersing a three-dimensional (3D) macroporous carbon template in the cadmium nitrate solution obtained in step a) and drying the 3D macroporous carbon template to obtain a cadmium nitrate-deposited template; conducting the immersing and drying step repeatedly until the cadmium nitrate deposited in the cadmium nitrate-deposited template has a mass ratio of 8% to 12%; and isolating the cadmium nitrate-deposited template from air and heating the cadmium nitrate-deposited template to obtain a cadmium oxide-deposited template;
c) dissolving tetraethyl orthosilicate (TEOS) in a second mixed solution of ethanol, water and acid to obtain a TEOS sol; and d) immersing the cadmium oxide-deposited template in step b) in the TEOS sol prepared in step c) to obtain a treated cadmium oxide-deposited template, burning the treated cadmium oxide-deposited template in air after the TEOS sol is volatilized to obtain a product, and grinding the product to obtain the cadmium oxide-doped silica microspheres.

10. The preparation method according to claim 1, wherein, step 1) comprises:
a) dissolving cadmium nitrate in an ethanol aqueous solution to obtain a cadmium nitrate solution;
b) immersing a three-dimensional (3D) macroporous carbon template in the cadmium nitrate solution obtained in step a) and drying the 3D macroporous carbon template to obtain a cadmium nitrate-deposited template; conducting the immersing and drying step repeatedly until the cadmium nitrate deposited in the cadmium nitrate-deposited template has a mass ratio of 8% to 12%; and isolating the cadmium nitrate-deposited template from air and heating the cadmium nitrate-deposited template to obtain a cadmium oxide-deposited template;
c) dissolving tetraethyl orthosilicate (TEOS) in a second mixed solution of ethanol, water and acid to obtain a TEOS sol; and
d) immersing the cadmium oxide-deposited template in step b) in the TEOS sol prepared in step c) to obtain a treated cadmium oxide-deposited template, burning the treated cadmium oxide-deposited template in air after the TEOS sol is volatilized to obtain a product, and grinding the product to obtain the cadmium oxide-doped silica microspheres.

11. The preparation method according to claim 10, wherein, in step b), the cadmium nitrate-deposited template is heated to 420° C. to 480° C.

12. The preparation method according to claim 10, wherein, in step d), the treated cadmium oxide-deposited template is burnt in air at 580° C. to 620° C.

13. Luminescent microspheres, wherein the luminescent microspheres are prepared by the preparation method according to claim 1.

14. The luminescent microspheres according to claim 13, wherein, the luminescent microspheres have fluorescence efficiency not less than 95%.

15. The luminescent microspheres according to claim 13, wherein, in step 2), the cadmium oxide-doped silica microspheres are added at an amount 1% to 10% (w/v) of the first mixed solution.

16. The luminescent microspheres according to claim 15, wherein, in the first mixed solution, the octadecene or the TOA has a volume ratio of 1:1 to 9:1 with the oleic acid.

17. The luminescent microspheres according to claim 13, wherein, in step 3), the selenium precursor has a molar ratio of 1:1 to 3:1 with the organic cadmium in the organic cadmium-adsorbed silica suspension.

18. The luminescent microspheres according to claim 17, wherein, the selenium precursor is at least one selected from the group consisting of TBPSe and TOPSe.

19. The luminescent microspheres according to claim 13, wherein step 1) comprises:
a) dissolving cadmium nitrate in an ethanol aqueous solution to obtain a cadmium nitrate solution;
b) immersing a three-dimensional (3D) macroporous carbon template in the cadmium nitrate solution obtained in step a) and drying the 3D macroporous carbon template to obtain a cadmium nitrate-deposited template; conducting the immersing and drying step repeatedly until the cadmium nitrate deposited in the cadmium nitrate-deposited template has a mass ratio of 8% to 12%; and isolating the cadmium nitrate-deposited template from air and heating the cadmium nitrate-deposited template to obtain a cadmium oxide-deposited template;

c) dissolving tetraethyl orthosilicate (TEOS) in a second mixed solution of ethanol, water and acid to obtain a TEOS sol; and d) immersing the cadmium oxide-deposited template in step b) in the TEOS sol prepared in step c) to obtain a treated cadmium oxide-deposited template, burning the treated cadmium oxide-deposited template in air after the TEOS sol is volatilized to obtain a product, and grinding the product to obtain the cadmium oxide-doped silica microspheres.

20. The luminescent microspheres according to claim 19, wherein, in step b), the cadmium nitrate-deposited template is heated to 420° C. to 480° C.

\* \* \* \* \*